(12) United States Patent
Chou et al.

(10) Patent No.: US 8,522,291 B2
(45) Date of Patent: Aug. 27, 2013

(54) VIDEO PLAYBACK DEVICE FOR CHANNEL BROWSING

(75) Inventors: Cheng-Fu Chou, Taipei (TW); Han-wu Chou, Hsinchu County (TW); Cheng-sean Chen, Hsin-Chu (TW)

(73) Assignee: AVerMedia Technologies, Inc., New Taipei (TW)

( * ) Notice: Subject to any disclaimer, the term of this patent is extended or adjusted under 35 U.S.C. 154(b) by 1355 days.

(21) Appl. No.: 12/003,189

(22) Filed: Dec. 20, 2007

(65) Prior Publication Data

US 2008/0163303 A1    Jul. 3, 2008

Related U.S. Application Data

(60) Provisional application No. 60/877,690, filed on Dec. 29, 2006.

(51) Int. Cl.
*H04N 7/173*    (2011.01)

(52) U.S. Cl.
USPC .............................................. 725/94; 725/120

(58) Field of Classification Search
USPC .......................................................... 725/94
See application file for complete search history.

(56) References Cited

U.S. PATENT DOCUMENTS

| | | | |
|---|---|---|---|
| 5,027,400 A | 6/1991 | Baji et al. | |
| 5,191,424 A | 3/1993 | Nohmi et al. | |
| 5,206,722 A | 4/1993 | Kwan | |
| RE36,680 E * | 5/2000 | Zdepski et al. | 375/240.05 |
| 6,496,980 B1 * | 12/2002 | Tillman et al. | 725/90 |
| 6,973,667 B2 * | 12/2005 | Fritsch | 725/88 |
| 7,100,193 B2 * | 8/2006 | Hassell et al. | 725/136 |
| 7,565,677 B1 * | 7/2009 | Crinon et al. | 725/114 |
| 7,587,467 B2 * | 9/2009 | Hesselink et al. | 709/214 |
| 7,672,235 B1 * | 3/2010 | Lian et al. | 370/230 |
| 7,826,536 B2 * | 11/2010 | Hannuksela et al. | 375/240.26 |
| 2002/0124264 A1 * | 9/2002 | Kikinis | 725/112 |
| 2003/0097661 A1 | 5/2003 | Li et al. | |
| 2005/0081244 A1 * | 4/2005 | Barrett et al. | 725/97 |
| 2005/0108754 A1 * | 5/2005 | Carhart et al. | 725/47 |
| 2005/0229221 A1 * | 10/2005 | Kerofsky et al. | 725/100 |
| 2006/0026663 A1 * | 2/2006 | Kortum et al. | 725/134 |
| 2006/0064476 A1 * | 3/2006 | Decasper et al. | 709/223 |
| 2006/0150225 A1 * | 7/2006 | Hegg et al. | 725/89 |
| 2007/0083901 A1 * | 4/2007 | Bond | 725/94 |
| 2007/0220562 A1 * | 9/2007 | Janssen et al. | 725/81 |

* cited by examiner

*Primary Examiner* — Brian Pendleton
*Assistant Examiner* — Jonathan V Lewis
(74) *Attorney, Agent, or Firm* — CKC & Partners Co., Ltd.

(57) ABSTRACT

A video playback device, provided in a P2P-based network, comprises a channel pre-cached buffer, for storing a plurality of video blocks corresponding to a number of pre-cached channels; a display interface, for receiving a request for channel browsing from a viewer and executing playback of the video blocks pertaining to a selected channel indicated on the request; and an agent module, for receiving the request for channel browsing from the display interface, obtaining a seed/peer list pertaining to the selected channel indicated on the request, and downloading the video blocks from seed and/or peer nodes based on the seed/peer list; characterized in that the agent module applies an automatic refreshing mechanism for updating the corresponding video blocks to each pre-cached channel by supplying the most updated video blocks in the channel pre-cached buffer.

19 Claims, 4 Drawing Sheets

VIDEO PLAYBACK DEVICE FOR CHANNEL BROWSING

This application claims the benefit of Provisional Application Ser. No. 60/877,690 entitled "P2P-based broadcast system and method using the same" filed on Dec. 29, 2006. The disclosure of the Provisional Application is incorporated herein.

BACKGROUND OF THE INVENTION

1. Field of the Invention

The present invention relates to a video playback device for channel browsing, and more particularly to a video playback device for channel browsing in a P2P based network.

2. Description of the Related Art

With the advent of networking communications technology, many people's daily lives are closely related to the Internet/Intranet business and are significantly influenced by the Internet/Intranet technology's evolution and revolution. More and more people use the Internet/Intranet and even access or browse the Internet/Intranet in their daily lives, whether for work, entertainment, shopping, or education, etc. The Internet/Intranet is creating new economical activities, which are altering people's traditional way of living.

It's known that IP-based TV system was proposed several years ago. The IP-based TV system provides people with the possibility of watching TV programs via internet/intranet at a location, such as at home, by using only a regular PC embedded with software or specific device (e.g. set top box). Although people may watch video contents (e.g. television shows or programs), which have been broadcasted over the internet/intranet, however, most IP-based service providers do not guarantee the quality of video contents to viewers during broadcasting. In addition, most of the local telecom carriers, on-line TV providers, and web-site companies provide the video content in their own mother or familiar languages rather than other foreign languages; for example, all the Asian Americans are difficult to receive the high quality of Asian TV programs which are originally broadcast in Asia.

In current network environments, there is wide interest for viewers to receive such TV programs provided by Internet content providers in a faster way. However, referred to FIG. 1, the conventional viewer/server network architecture does not fulfill the viewer's needs due to lack of available bandwidth of the network and heavy workload of the central server. In case of network traffic congestion, when a particular video content is being accessed by many viewers, it will take much time for downloading the complete video content from the central server.

To sum up, referred to FIG. 1 for illustrating a conventional IP-based TV system. The IP-based TV system 10 with a TV content broadcasting center 11 is responsible to deliver the TV programs to the viewer players via the Internet or intranet. It's no doubt that the IP-based TV system 10 serves the customers with English video contents, for example, in the United States. If the non-English Asian-based customers desire to receive the non-English Asian-based TV programs from the system, for example, one Chinese viewer accesses to the viewer player 13, one Korean viewer accesses to the viewer player 14, and one Japanese viewer accesses to the viewer player 15, each for being desirous of watching their own native TV programs delivered from the TV content broadcasting center 11, the system will get trouble in selection of different language types of TV programs so that these viewers' need cannot be satisfied.

A prior art of U.S. Pat. No. 5,027,400 has disclosed an approach to providing an image communication/bidirectional broadcast system such as a broadband ISDN or a cable television, and in particular, to an advertisement or commercial base bidirectional broadcast system capable of coping with various needs of subscribers for programs and advertisement. This art does not solve the situation when a viewer is desirous of watching his/her hometown TV programs during his/her traveling period.

A prior art of U.S. Pat. No. 6,973,667 has disclosed an approach to delivering media program contents to customers through multicast or unicast, and wherein a multicast delivery unit and a unicast delivery unit will deliver the data packets of the media program to customers in multicasting and unicasting fashions, respectively. Moreover, the art is to provide the time-shifting feature such as TV programs recording in the viewer sides. However, this art does not solve the time zone issues when the customers desire to watch the overseas TV programs in the same broadcast time schedule as it was broadcast in the originating time zone like East Asia regions.

A prior art of US patent No. US20030097661 has disclosed a system for providing IP centric, multi-channel and telecommunication services such as television on demand, video on demand, karaoke on demand, Internet access, and telephone services. However this art merely provide customers with TV programs and customers have no other language selections for receiving the TV programs originated by the specific language which is mother tongue to the customers.

Two prior arts of U.S. Pat. Nos. 5,191,424 and 5,206,722 have disclosed a channel selector operable in a typical cable television (CATV), and the channel selector has nothing with the application of a P2P network. Thus, it is very hard to deal with such issues occurred in the P2P environment as network bandwidth and communication delay which are very concerned with the quality of service to the network service providers in the P2P network.

In some case, if a viewer subscribed to the TV program provider would like to watch the same hometown TV programs when he/she is planning to be out of town or travel overseas, it is impossible to watch the same hometown TV programs in this case. On the other hand, the viewer may request an agency for delivering his/her hometown TV programs with high quality and resolution to watch during his/her travel period. However, high quality and resolution for broadcasting the TV programs sometimes means more bandwidth consumption when the viewer is in the session of watching TV programs via the P2P network. Besides, it is critical for delivering the TV channel browsing service to the viewer in a timely fashion when the viewer is trying to browse a new TV program from an existing TV program through his/her playback device.

Therefore, there is a need for providing a channel browsing service through the P2P network for the viewer so that he/she may still have same feeling to watch TV programs broadcast in the P2P network as he/she is used to watch TV programs broadcast in the cable system during the channel browsing session.

SUMMARY OF THE INVENTION

In order to solve the above-mentioned problems, the present invention provides a video playback device connected to a P2P-based network, which comprises a channel pre-cached buffer for storing a plurality of video blocks corresponding to a number of pre-cached channels; a display interface for receiving a request for channel browsing from a viewer and executing playback of the video blocks pertaining to a selected channel indicated on the request; and an agent module for receiving the request for channel browsing from the display interface, obtaining a seed/peer list pertaining to the selected channel indicated on the request, and downloading the video blocks from seed and/or peer nodes based on the seed/peer list; the video playback device according to the invention is characterized in that the agent module applies an automatic refreshing mechanism for updating the corresponding video blocks to each pre-cached channel by supplying the most updated video blocks in the channel pre-cached buffer.

Besides, the present invention also provides a channel browsing method, which comprises the steps of:

(1) providing a video playback device which comprises a channel pre-cached buffer 21, a display interface 22, an agent module 23, a decoding module 24 and a DRM-MUX module 25 so as to play back TV channel contents over a P2P-based network;

(2) sending a request for channel browsing to the agent module 23 from a viewer when the viewer makes a channel selection for a new selected TV channel, wherein the request with the selected channel is initiated when a channel selection button on the display interface 22 is clicked on;

(3) receiving the request at the agent module 23 from the display interface 22 and starting to obtain a seed/peer list pertaining to the selected channel indicated on the request, wherein the agent module 23 retrieves the plural video blocks based on the seed/peer list through the P2P communication operations;

(4) starting to download the video blocks at the agent module for the selected channel from seed and/or peer nodes in the P2P-based network, wherein the video blocks of the selected channel are scattered over the seed and/or peer nodes based on the seed/peer list which indicates the IP addresses of the seed and/or peer nodes;

(5) continuing to download the video blocks for the selected channel at the agent module until the number of video blocks reaching to a predetermined number W in the channel pre-cached buffer;

(6) executing playback of the selected channel at the display interface while receiving the predetermined number W of the video blocks pertaining to the selected channel; and (7) starting to implement an automatic refreshing mechanism at the agent module for refreshing the other pre-cached channels except the selected channel by supplying the most lately video blocks in the channel pre-cached buffer.

Therefore, it is a principal object of the present invention to provide a video playback device having a channel selection option for allowing viewers to select a particular TV channel for watching in a timely fashion so that viewers can watch the selected TV channel smoothly within an allowable delay time.

It is another principal object of the present invention to provide the video playback device having a channel selection option for allowing viewers to select a particular TV channel for watching in a reasonable image resolution so that viewers can watch the selected TV channel content without image distortion.

It is yet another principal object of the present invention to provide the video playback device having a channel selection option for allowing viewers to select a particular TV channel for watching in less bandwidth consumption so that viewers can watch the selected TV channel content in an efficient fashion.

BRIEF DESCRIPTION OF THE DRAWINGS

FIG. 3b is another part of the illustrative diagram of the automatic refreshing algorithm in FIG. 3a.

DETAILED DESCRIPTION OF THE EMBODIMENTS

The present invention discloses a video playback device having the channel browsing feature which can smoothly play TV video contents during the session of TV channel selection over a P2P based network based on the internet and/or intranet, wherein the basic principles or techniques of the video compression and P2P communication protocol are well-known by those skilled in the art, the following description will omit the description of the principles. Moreover, the diagrams included in the following are not completely drawn according to the real size and are only used to demonstrate features related to the present invention.

Figure 1:
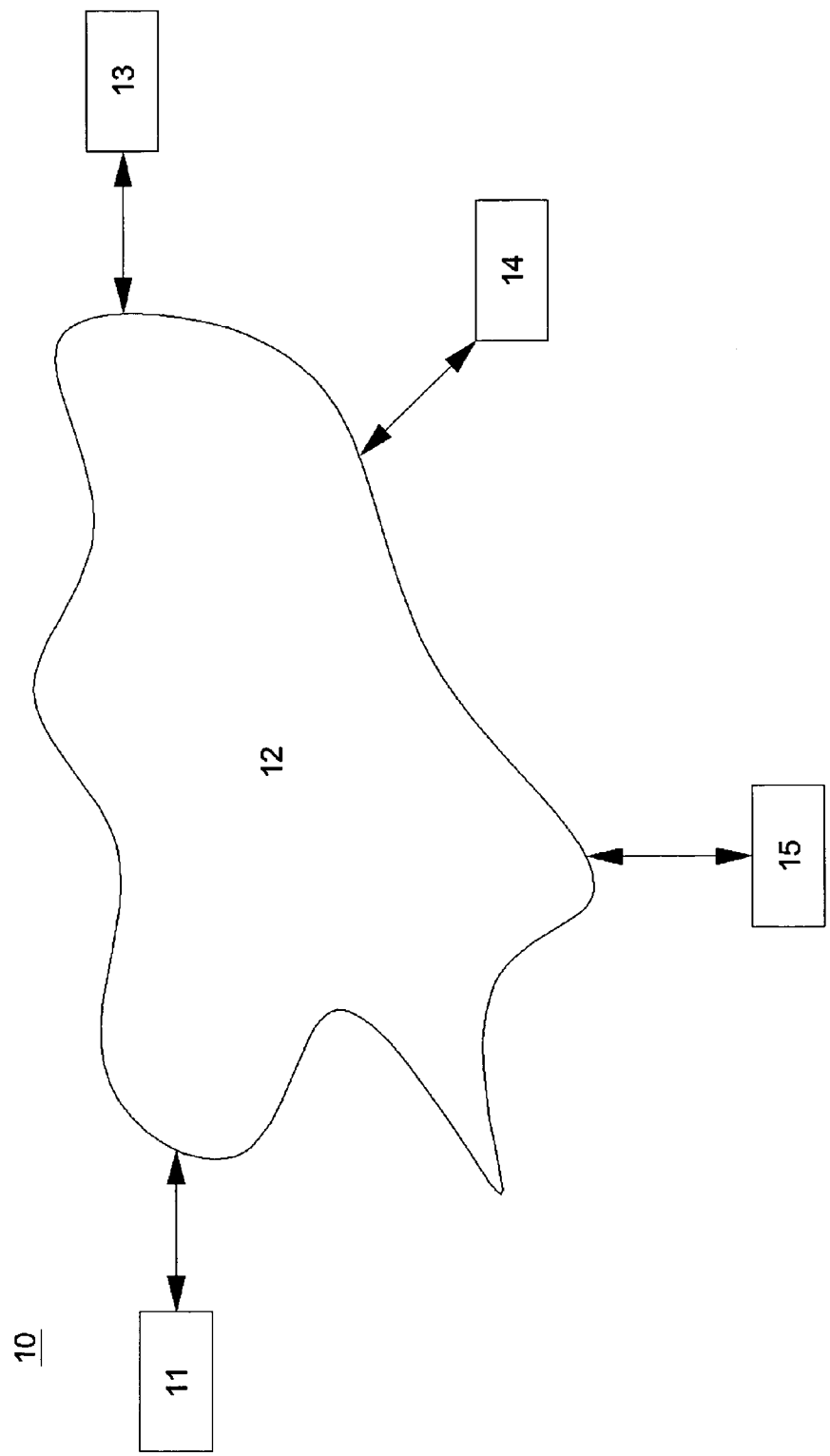
FIG. 1 is a prior art illustration of the conventional broadcasting system.
Figure 2:
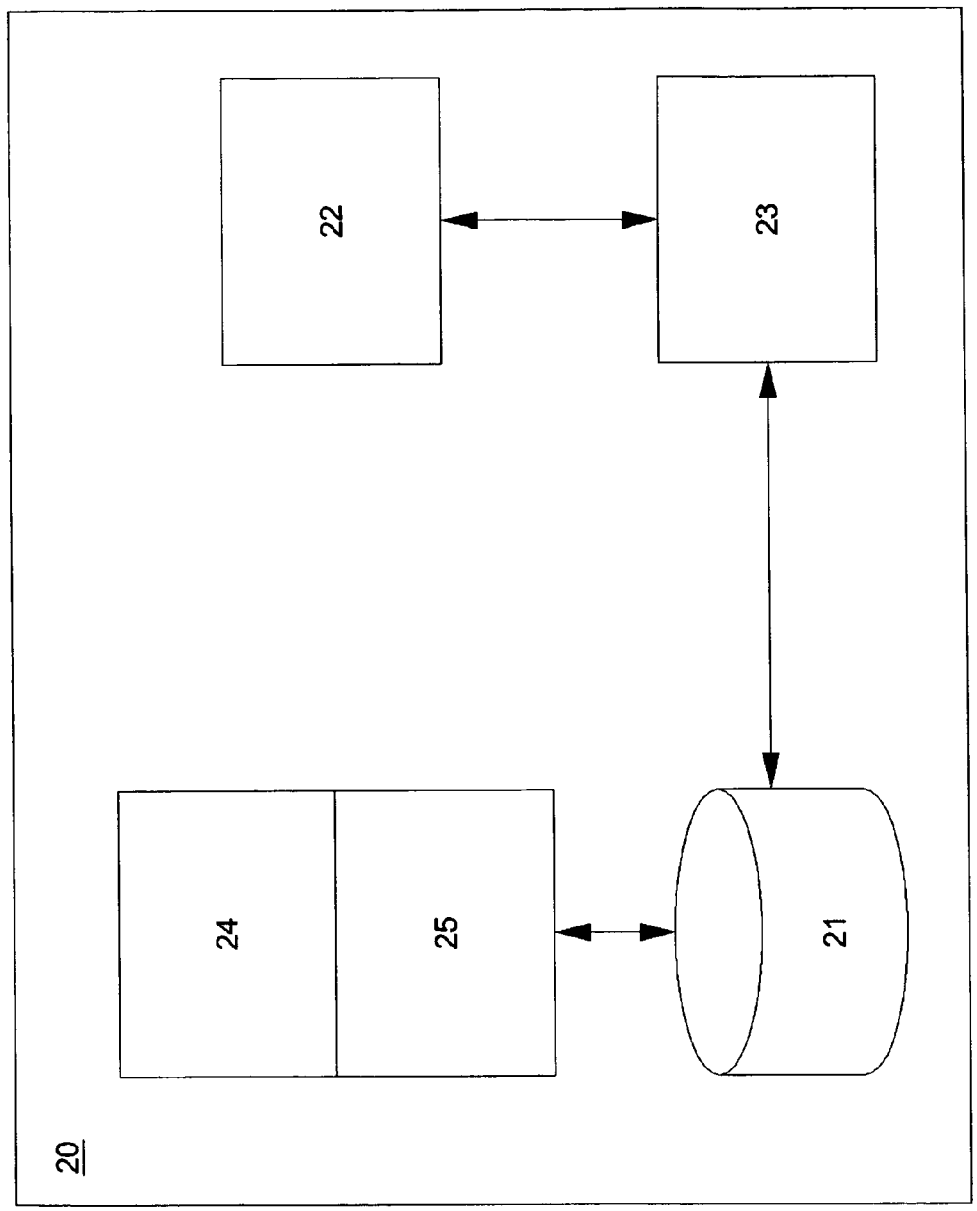
FIG. 2 is an illustrative diagram of a video playback device according to a first preferable embodiment of the present invention.

Referring to FIG. 2, a video playback device 20 in a P2P-based network according to a first preferable embodiment of the present invention is depicted. A video playback device 20, which is provided in a P2P-based network, comprises a channel pre-cached buffer 21, a display interface 22, an agent module 23, a decoding module 24 and a DRM-MUX module 25, wherein the channel pre-cached buffer 21 is adapted for storing a plurality of video blocks 210 (i.e. electronic video files, which is a minimum unit transmitted in the P2P network) in a storage medium for increasing the caching rate of the video blocks 210 and each of the video blocks 210 is corresponding to each of pre-cached TV channels 212 that are predetermined to store in the channel pre-cached buffer 21 based on the viewer favorite TV channels or most frequently watched by viewers; the display interface 22 is adapted for receiving a request for channel browsing from a viewer where the request indicates a selected TV channel 221 which the viewer would like to watch, and sends the request to the agent module 23 for receiving video blocks 210 pertaining to the selected TV channel 221 and playing back the video blocks 210; the agent module 23 is adapted for receiving the request for channel browsing from the display interface 22, retrieving a seed/peer list 231 pertaining to the selected channel 221 indicated on the request, and downloading the video blocks 210 from seed and/or peer nodes based on the seed/peer list 231 over the P2P network; the decoding module 24 is adapted for decoding the received video blocks 210 from the seed and/or peer nodes over the P2P network so as to decompress the video compression of the received video blocks 210 prior to those being sent to the channel pre-cached buffer 21 for depositing; the DRM-MUX module 25 is adapted for removing the DRM (digital right management) watermarks attached to each of the received video blocks 210. It is noted that a TV channel in each session is usually composed of a plural video blocks but the channel pre-cached buffer 21 only reserves a couple video blocks for each TV channels except for the current selected TV channel which has more video blocks than any other pre-cached TV channels do in the channel pre-cached buffer 21.

Figure 3A:
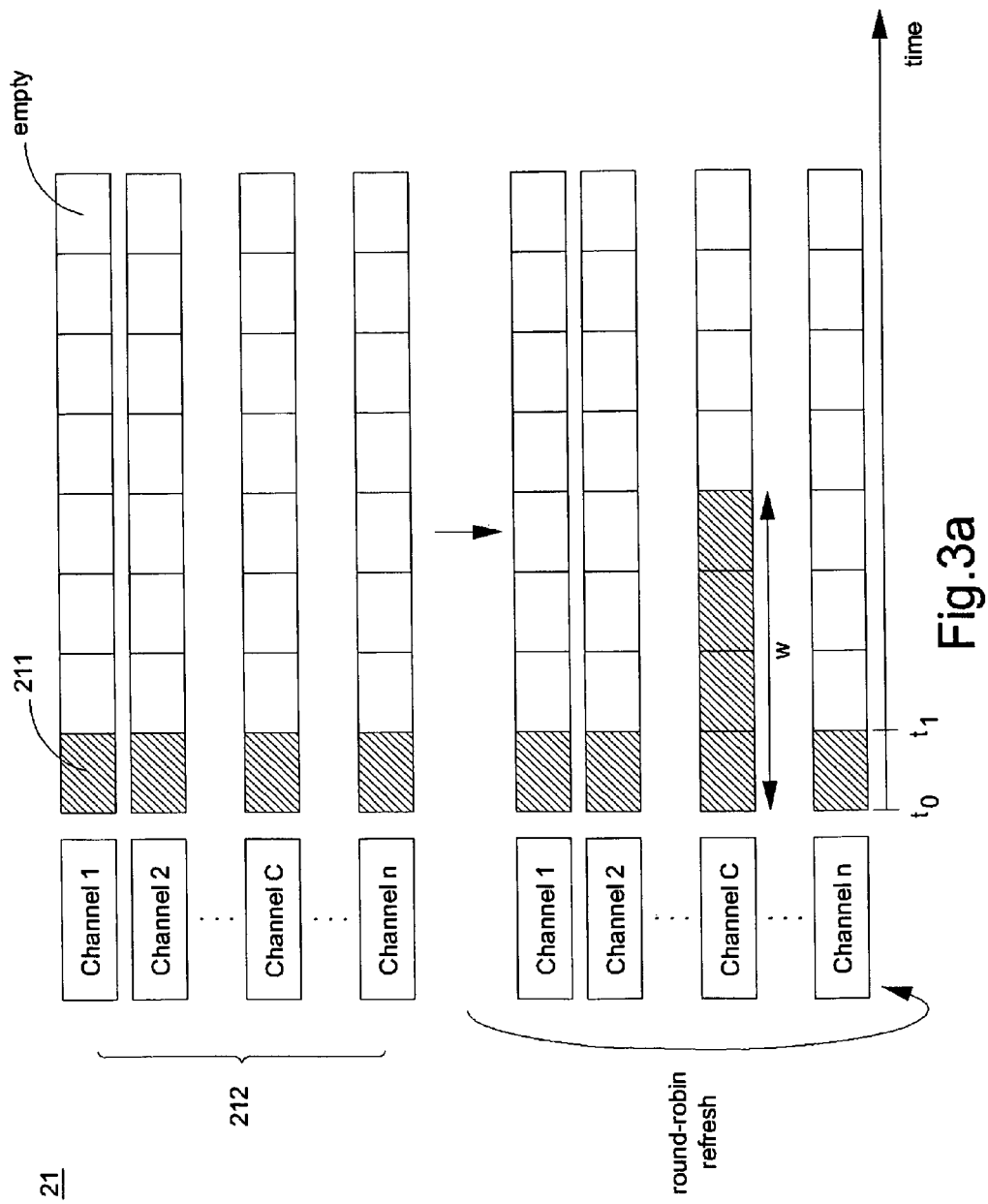
FIG. 3a is one part of an illustrative diagram of an automatic refreshing algorithm according to the first preferable embodiment of the present invention.

In the above mentioned embodiment, the video playback device 20 is characterized in that the agent module 23 uses an automatic refreshing mechanism to refresh each pre-cached channel 212 with the corresponding most lately video block 211 in the channel pre-cached buffer 21. Referring to FIG. 3a, an automatic refreshing mechanism for refreshing the channel pre-cached buffer is depicted. At the very beginning time $t_0$, the viewer just logins and has not decided to watch any of TV channels, and thus the automatic refreshing mechanism performs one of random, round-robin and priority approaches to refreshing all the pre-cached TV channels in the channel pre-cached buffer 21 by means of supplying each of the most lately video blocks 210 corresponding to each pre-cached TV channel 221. The round-robin approach is applied in this case such that the channel "1", channel "2", . . . , and channel "n" will be refreshed in a sequential order. When the viewer decides to watch the channel "C" at time $t_1$, the channel "C" is selected and a channel selection button is clicked on the display interface 22 and thus a request for browsing the selected channel "C" is sent to the agent module 23. When the agent module 23 receives the request, it stops the automatic refreshing mechanism for performing the refreshment of all the pre-cached channels and requests the channel pre-cached buffer 21 for retrieving the video blocks 210 of the selected channel "C". Thus, the channel pre-cached buffer 21 accumulates a predetermined number W of video blocks 210 of the selected channel "C" and then sends them to the agent module 23 for further playing back the selected channel "C". In this case, the predetermined number W (e.g. four of video blocks shown in FIG. 3a) is dependent on the configuration requirement of the video playback device 20. Therefore, when the channel browsing event occurs, the automatic refreshing mechanism is interrupted in this moment so that the channel pre-cached buffer 21 is required to stop refreshing the other pre-cached channels until four of the video blocks 210 of the selected channel "C" are being received. On the other hand, the automatic refreshing mechanism will start again to refresh the other pre-cached channels after four of the video blocks 210 of the selected channel "C" are being received and sent out to the agent module 23.

Figure 3B:
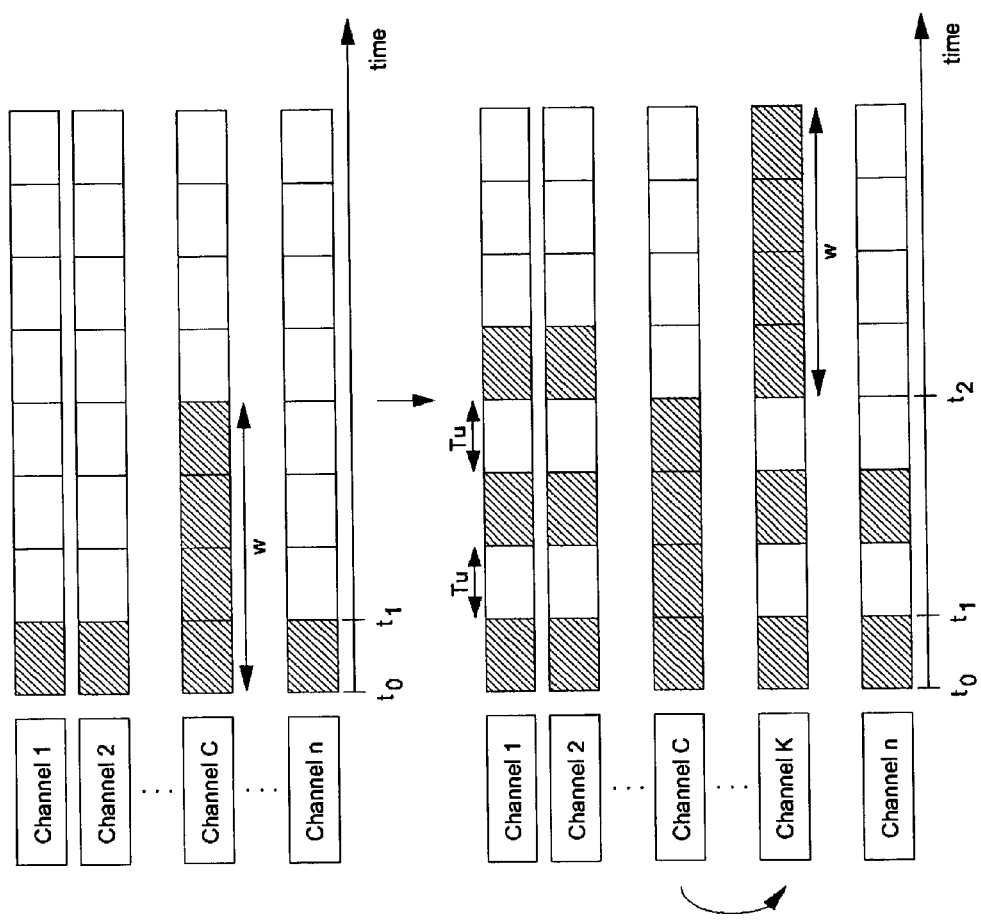

Referring to FIG. 3b, when the viewer is desirous to switch the current TV channel "C" to a new TV channel "K" at time $t_2$, a request for browsing the selected channel "K" is initiated to retrieve the video blocks 210 corresponding to the channel "K" from the channel pre-cached buffer 21. Meanwhile, the automatic refreshing mechanism stops refreshing the other pre-cached channels until four of video blocks 210 of the selected channel "K" are being received, in this case, the automatic refreshing mechanism just stops in the channel "2" at time $t_2$, and the refresh task will be restarted at the channel "3" (not shown) after four of video blocks 210 of the selected channel "K" are being received. Next, four of the video blocks 210 corresponding to the selected channel "K" are sent to the agent module 23 and then to the display interface 22 for playback after they are received, decompressed and DRM removed, and the automatic refreshing mechanism is started again to perform the refreshing task from the pre-cached channel "3". It is noted that there is a processing time (so called startup latency Ts, not shown) required to play back four of the video blocks 210 of the selected channel in the display interface 22, wherein Ts is determined from the formula below:

$$Ts=k*B/R,$$

where k is a coefficient which indicates the number of video blocks 210 of the selected channel for current playback (i.e. k can be set to be at least one, and k is equal to four in this case), B is the block size for each video block, and R is a predetermined channel playback rate of the video playback device.

Furthermore, a channel class is provided for each pre-cached channel 212 to indicate the viewer's priority or importance of watching pre-cached channels 212. Therefore, each most lately video block 211 pertaining to each pre-cached channel 212 is received in the channel pre-cached buffer 21 through the agent module 23 in a manner determined by the channel class so that the viewer may watch the selected TV channel in an allowable delay time Tu (e.g. a couple seconds) after he/she makes a channel browsing. Besides, the channel class can also be used as a key indicator when the automatic refreshing mechanism takes the priority approach to refreshing the pre-cached channels 212, that is to say, the higher the channel class is, the less the allowable delay time Tu is. Besides, each video block having different image resolution is provided for the convenience of less bandwidth consumption while video blocks 210 are transmitted over the P2P network. For example, each of the video blocks 210 for one pre-cached channel is provided with different or identical resolutions. Alternatively, each of the pre-cached channels is provided with different or identical resolutions. In the former case, the agent module 23 may receive the less-resolution video blocks 210 and subsequently the normal-resolution ones for the same pre-cached channel. In the latter case, the agent module 23 may receive all the less-resolution video blocks 210 for one pre-cached channel and all the higher-resolution ones for another pre-cached channel.

In addition, the present invention also discloses a channel browsing method according to a second preferable embodiment of the present invention, and the channel browsing method performs the steps of:

(1) providing a video playback device 20 which comprises a channel pre-cached buffer 21, a display interface 22, an agent module 23, a decoding module 24 and a DRM-MUX module 25 so as to play back TV channel contents over a P2P-based network, wherein the video playback device 20 has the identical technical features as shown in FIG. 2;

(2) sending a request for channel browsing to the agent module 23 from a viewer when the viewer makes a channel selection for a new selected TV channel, wherein the request with the selected channel is initiated when a channel selection button on the display interface 22 is clicked on;

(3) receiving the request at the agent module 23 from the display interface 22 and starting to obtain a seed/peer list pertaining to the selected channel indicated on the request, wherein the agent module 23 retrieves the plural video blocks based on the seed/peer list through the P2P communication operations;

(4) starting to download the video blocks at the agent module for the selected channel from seed and/or peer nodes in the P2P-based network, wherein the video blocks of the selected channel are scattered over the seed and/or peer nodes based on the seed/peer list which indicates the IP addresses of the seed and/or peer nodes;

(5) continuing to download the video blocks for the selected channel at the agent module until the number of video blocks reaching to a predetermined number W in the channel pre-cached buffer;

(6) executing playback of the selected channel at the display interface while the channel pre-cached buffer 21 receiving the predetermined number W of the video blocks pertaining to the selected channel; and (7) starting to implement an automatic refreshing mechanism at the agent module for refreshing the other pre-cached channels except the selected channel by supplying the most lately video blocks in the channel pre-cached buffer 21, wherein each of the most lately video blocks in the channel pre-cached buffer 21 is provided for corresponding to each pre-cached channel except for the current playback channel.

In the above mentioned embodiment, the video playback device 20 is characterized in that the agent module 23 uses an automatic refreshing mechanism to refresh each pre-cached channel 212 with the corresponding most lately video block 211 in the channel pre-cached buffer 21. Referring back to FIG. 3a, an automatic refreshing mechanism for refreshing the channel pre-cached buffer is depicted. At the very beginning time $t_0$, the viewer just logins and has not decided to watch any of TV channels, and thus the automatic refreshing mechanism performs one of random, round-robin and priority approaches to refreshing all the pre-cached TV channels in the channel pre-cached buffer 21 by means of supplying each of the most lately video blocks 210 corresponding to each pre-cached TV channel 221. The round-robin approach is applied in this case such that the channel "1", channel "2", . . . , and channel "n" will be refreshed in a sequential order. When the viewer decides to watch the channel "C" at time $t_1$, the channel "C" is selected and a channel selection button is clicked on the display interface 22 and thus a request for browsing the selected channel "C" is sent to the agent module 23. When the agent module 23 receives the request, it stops the automatic refreshing mechanism for performing the refreshment of all the pre-cached channels and requests the channel pre-cached buffer 21 for retrieving the video blocks 210 of the selected channel "C". Thus, the channel pre-cached buffer 21 accumulates a predetermined number W of video blocks 210 of the selected channel "C" and then sends them to the agent module 23 for further playing back the selected channel "C". In this case, the predetermined number W (e.g. four of video blocks shown in FIG. 3a) is dependent on the configuration requirement of the video playback device 20. Therefore, when the channel browsing event occurs, the automatic refreshing mechanism is interrupted in this moment so that the channel pre-cached buffer 21 is required to stop refreshing the other pre-cached channels until four of the video blocks 210 of the selected channel "C" are being received. On the other hand, the automatic refreshing mechanism will start again to refresh the other pre-cached channels after four of the video blocks 210 of the selected channel "C" are being received and sent out to the agent module 23.

Referring back to FIG. 3b, when the viewer is desirous to switch the current TV channel "C" to a new TV channel "K" at time $t_2$, a request for browsing the selected channel "K" is initiated to retrieve the video blocks 210 corresponding to the channel "K" from the channel pre-cached buffer 21. Meanwhile, the automatic refreshing mechanism stops refreshing the other pre-cached channels until four of video blocks 210 of the selected channel "K" are being received, in this case, the automatic refreshing mechanism just stops in the channel "2" at time $t_2$, and the refresh task will be restarted at the channel "3" (not shown) after four of video blocks 210 of the selected channel "K" are being received. Next, four of the video blocks 210 corresponding to the selected channel "K" are sent to the agent module 23 and then to the display interface 22 for playback after they are received, decompressed and DRM removed, and the automatic refreshing mechanism is started again to perform the refreshing task from the pre-cached channel "3". It is noted that there is a processing time (so called startup latency Ts, not shown) required to play back four of the video blocks 210 of the selected channel in the display interface 22, wherein Ts is determined from the formula below:

$$Ts = k*B/R,$$

where k is a coefficient which indicates the number of video blocks 210 of the selected channel for current playback (i.e. k can be set to be at least one, and k is equal to four in this case), B is the block size for each video block, and R is a predetermined channel playback rate of the video playback device.

Furthermore, a channel class is provided for each pre-cached channel 212 to indicate the viewer's priority or importance of watching pre-cached channels 212. Therefore, each most lately video block 211 pertaining to each pre-cached channel 212 is received in the channel pre-cached buffer 21 through the agent module 23 in a manner determined by the channel class so that the viewer may watch the selected TV channel in an allowable delay time Tu (e.g. a couple seconds) after he/she makes a channel browsing. Besides, the channel class can also be used as a key indicator when the automatic refreshing mechanism takes the priority approach to refreshing the pre-cached channels 212, that is to say, the higher the channel class is, the less the allowable delay time Tu is. Besides, each video block having different image resolution is provided for the convenience of less bandwidth consumption while video blocks 210 are transmitted over the P2P network. For example, each of the video blocks 210 for one pre-cached channel is provided with different or identical resolutions. Alternatively, each of the pre-cached channels is provided with different or identical resolutions. In the former case, the agent module 23 may receive the less-resolution video blocks 210 and subsequently the normal-resolution ones for the same pre-cached channel. In the latter case, the agent module 23 may receive all the less-resolution video blocks 210 for one pre-cached channel and all the higher-resolution ones for another pre-cached channel.

The above-mentioned preferred embodiments are not meant to limit the scope of the present invention. The description of the present invention should be understood by those skilled in the art. In view of the above teaching, other embodiments may be envisioned by those skilled in the art without departing from the spirit of the invention. Moreover, any changes or modifications or the equivalent thereof that can be made without departing from substantial spirit of the present invention should be protected by the following claims.

We claim:

1. A video playback device, provided in a P2P-based network, comprising:
   a channel pre-cached buffer, for storing a plurality of video blocks corresponding to a number of pre-cached channels;
   a display interface, for receiving a request for channel browsing from a viewer and executing playback of the video blocks pertaining to a selected channel indicated on the request; and
   an agent mechanism, for receiving the request for channel browsing from the display interface, obtaining a seed/peer list pertaining to the selected channel indicated on the request, and downloading the video blocks from seed and/or peer nodes based on the seed/peer list;
   characterized in that
   the agent mechanism applies an automatic refreshing mechanism for updating the corresponding video blocks to each pre-cached channel by supplying the most updated video blocks in the channel pre-cached buffer, wherein when the agent mechanism receives the request for channel browsing, the automatic refreshing mechanism stops refreshing, a predetermined number W of video blocks of the selected channel are received in the channel pre-cached buffer, and the automatic refreshing mechanism is started again to refresh the other pre-cached channels that have not been selected after the predetermined number W of video blocks of the selected channel are received in the channel pre-cached buffer.

2. The video playback device of claim 1, wherein the selected channel has a start up latency Ts for playback of its video blocks in the display interface when the viewer launches a request for channel browsing, whereby the start up latency Ts is determined from the formula below:

$Ts=k*B/R$, where k is a coefficient which indicates the number of video blocks of the selected channel for current playback,
B is the block size for each video block, and
R is a predetermined channel playback rate.

3. The video playback device of claim 2, wherein the coefficient k is set to be at least one.

4. The video playback device of claim 1, wherein each of the pre-cached channels further comprises a channel class.

5. The video playback device of claim 4, wherein the channel class for each pre-cached channel is determined by an allowable delay time Tu.

6. The video playback device of claim 5, wherein the most updated video block is playback at the time within the allowable delay time Tu.

7. The video playback device of claim 1, wherein the automatic refreshing mechanism is implemented in one of the random way, round-robin way and priority way for updating the video blocks for the pre-cached channels except for the selected channel.

8. The video playback device of claim 1, wherein each of the video blocks in one pre-cached channel is provided with different or the same resolutions.

9. The video playback device of claim 1, wherein each of the pre-cached channels is provided with different or the same resolutions.

10. The video playback device of claim 7, wherein the priority way is implemented in the channel pre-cached buffer based on the channel class.

11. A channel browsing method, comprising the steps of:
(1) providing a video playback device which comprises a channel pre-cached buffer, a display interface and an agent mechanism for connecting to a P2P-based network;
(2) sending a request for channel browsing to the agent mechanism from a viewer on the display interface that indicates a selected channel;
(3) receiving the request at the agent mechanism from the display interface and starting to obtain a seed/peer list pertaining to the selected channel indicated on the request;
(4) starting to download the video blocks at the agent mechanism for the selected channel from seed and/or peer nodes in the P2P-based network;
(5) continuing to download the video blocks for the selected channel at the agent mechanism until the number of video blocks reaching to a predetermined number W in the channel pre-cached buffer;
(6) executing playback of the selected channel at the display interface while receiving the predetermined number W of the video blocks pertaining to the selected channel; and
(7) starting to implement an automatic refreshing mechanism at the agent mechanism for refreshing the video blocks corresponding to each pre-cached channel except for the selected channel by supplying the most lately video blocks in the channel pre-cached buffer, wherein when the agent mechanism receives the request for channel browsing, the automatic refreshing mechanism stops refreshing, predetermined number W of video blocks of the selected channel are received in the channel pre-cached buffer, and the automatic refreshing mechanism is started again to refresh the other pre-cached channels that have not been selected after the predetermined number W of video blocks of the selected channel are received in the channel pre-cached buffer.

12. The channel browsing method of claim 11, wherein the selected channel has a start up latency for playback of its video blocks in the display interface when the viewer launches a request for channel browsing, whereby the time length Ts is determined from the formula below:

$Ts=k*B/R$, where k is a coefficient which indicates the number of video blocks of the selected channel stored in the channel pre-cached buffer,
B is the block size for each video block, and
R is a predetermined channel playback rate.

13. The channel browsing method of claim 11, wherein the coefficient k is set to be at least one.

14. The channel browsing method of claim 11, wherein each of the pre-cached channels further comprises a channel class.

15. The channel browsing method of claim 14, wherein the channel class for each pre-cached channel is determined by an allowable delay time Tu.

16. The channel browsing method of claim 15, wherein the most updated video block is playback at the time within the allowable delay time Tu.

17. The channel browsing method of claim 11, wherein the automatic refreshing mechanism is implemented in one of the random way, round-robin way and priority way for updating the video blocks for the pre-cached channels except for the selected channel.

18. The channel browsing method of claim 11, wherein each of the video blocks in one pre-cached channel is provided with different or the same resolutions, or each of the pre-cached channels is provided with different or the same resolutions.

19. The channel browsing method of claim 17, wherein the priority way is implemented in the channel pre-cached buffer based on the channel class.

* * * * *